US006785470B2

(12) United States Patent
Ichimasa

(10) Patent No.: US 6,785,470 B2
(45) Date of Patent: Aug. 31, 2004

(54) CAPACITOR CHARGING DEVICE UTILIZING CURRENT DETECTION TO DETERMINE MALFUNCTION, AND STROBE AND CAMERA USING SAME

(75) Inventor: Shoji Ichimasa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/327,148

(22) Filed: Dec. 24, 2002

(65) Prior Publication Data

US 2003/0128974 A1 Jul. 10, 2003

(30) Foreign Application Priority Data

Jan. 9, 2002 (JP) ....................................... 2002-002406

(51) Int. Cl.[7] ............................ G03B 7/23; H05B 41/24
(52) U.S. Cl. .................... 396/206; 396/301; 315/241 P
(58) Field of Search ................................ 396/205, 206, 396/301; 315/214 R, 241 P

(56) References Cited

U.S. PATENT DOCUMENTS 5,913,085 A * 6/1999 Yamaguchi et al. ........ 396/205
6,317,565 B1 11/2001 Ichimasa .................... 396/123

FOREIGN PATENT DOCUMENTS

JP 8-8089 1/1996

* cited by examiner

*Primary Examiner*—Russell Adams
*Assistant Examiner*—Arthur A Smith
(74) *Attorney, Agent, or Firm*—Fitzpatrick, Cella, Harper & Scinto

(57) ABSTRACT

A strobe charging device includes a light-emitting tube; a main capacitor for accumulating energy and for supplying the energy to the light-emitting tube; a transformer circuit which includes primary and secondary coils in order to accumulate the energy of a power supply in the main capacitor; a control circuit for controlling a current flowing from the power supply to the primary coil; a current detection circuit for detecting a current flowing through the secondary coil; a time measuring circuit for measuring the time from when the control circuit stops a current flowing through the primary coil until the current detection circuit detects that the current flowing through the secondary coil reaches a predetermined level or until the current flowing through the secondary coil stops; a voltage detecting circuit for detecting the voltage of the main capacitor; and a determination circuit for determining the operation state of the device based on the measurement result generated by the time measuring circuit and on a voltage detected by the voltage detecting circuit.

12 Claims, 9 Drawing Sheets

| CHARGING VOLTAGE (V) | SECONDARY CURRENT DISCHARGE TIME (μS) |
|---|---|
| 0 ~ 30 | t < 50 |
| 30 ~ 50 | 5 < t < 20 |
| 50 ~ 100 | 3 < t < 15 |
| 100 ~ 320 | t > 5 |

CAPACITOR CHARGING DEVICE UTILIZING CURRENT DETECTION TO DETERMINE MALFUNCTION, AND STROBE AND CAMERA USING SAME

BACKGROUND OF THE INVENTION

1. Field of the Invention

The present invention relates to improvement in a capacitor charging device including a flyback DC/DC converter and a strobe charging device for a camera.

2. Description of the Related Art

Japanese Patent Laid-Open No. 8-008089 discloses a configuration for detecting a malfunction of a circuit provided to a strobe device. In this configuration, a timer is started at the beginning of a step-up operation, a charging voltage after predetermined time is stored, and then a battery is checked. If the charge level is low regardless of enough power of battery, the charge step-up operation is stopped and warning is given.

In the above-described known art, however, predetermined time is necessary in order to detect a circuit malfunction of a forward DC/DC converter. Therefore, detection of the circuit malfunction is disadvantageously delayed by the predetermined time.

SUMMARY OF THE INVENTION

An object of the present invention it to provide a capacitor charging device and a strobe charging device for a camera, in which the number of components does not increase and a circuit malfunction can be detected just after charging is started.

According to an aspect of the present invention, a strobe charging device comprises: a light-emitting tube; a main capacitor for accumulating energy and for supplying the energy to the light-emitting tube; a transformer circuit which includes primary and secondary coils in order to accumulate the energy of a power supply in the main capacitor; a control circuit for controlling a current flowing from the power supply to the primary coil; a current detection circuit for detecting a current flowing through the secondary coil; and a determination circuit for determining the operation state of the device based on a detection result generated by the current detection circuit. The primary coil is connected to the power supply and the secondary coil is connected to the main capacitor. Also, a current starts to flow through the secondary coil after the control circuit stops a current flowing through the primary coil.

According to another aspect of the present invention, a strobe charging device comprises: a light-emitting tube; a main capacitor for accumulating energy and for supplying the energy to the light-emitting tube; a transformer circuit which includes primary and secondary coils in order to accumulate the energy of a power supply in the main capacitor; a control circuit for controlling a current flowing from the power supply to the primary coil; a current detection circuit for detecting a current flowing through the secondary coil; a time measuring circuit for measuring the time from when the control circuit stops a current flowing through the primary coil until the current detection circuit detects that the current flowing through the secondary coil reaches a predetermined level or until the current flowing through the secondary coil stops; a voltage detecting circuit for detecting the voltage of the main capacitor; and a determination circuit for determining the operation state of the device based on the measurement result generated by the time measuring circuit and on a voltage detected by the voltage detecting circuit. The primary coil is connected to the power supply and the secondary coil is connected to the main capacitor. Also, a current starts to flow through the secondary coil after the control circuit stops a current flowing through the primary coil.

Preferably, the determination circuit determines the operation state of the device based on a time corresponding to the voltage detected by the voltage detecting circuit and on the time measured by the time measuring circuit.

Further objects, features and advantages of the present invention will become apparent from the following description of the preferred embodiments with reference to the attached drawings.

DESCRIPTION OF THE PREFERRED EMBODIMENTS

Hereinafter, embodiments of the present invention will be described with reference to the drawings.

First Embodiment

Figure 1:
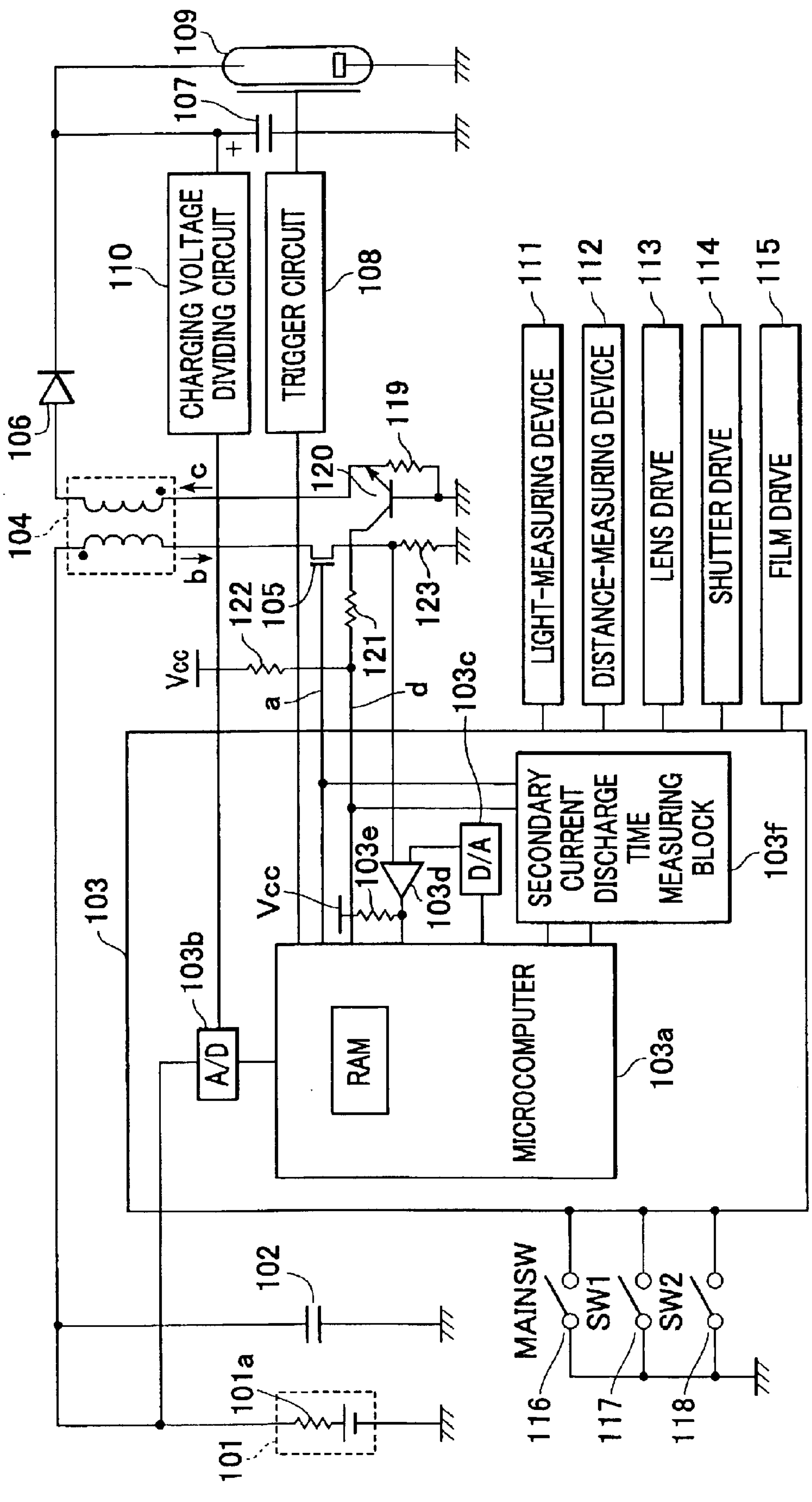
FIG. 1 is a block diagram showing the circuit configuration of a main part of a camera according to embodiments of the present invention.

FIG. 1 is a block diagram showing the circuit configuration of a main part of a camera including a strobe device having a flyback DC/DC converter according to a first embodiment of the present invention.

In FIG. 1, a battery 101 serves as a power supply and includes a resistor 101*a*. A capacitor 102 is connected to the battery 101 in parallel. A control circuit 103 including an IC controls a camera sequence such as light-measurement, distance-measurement, lens driving, and film feeding, and a strobe device. A D/A converter 103*c* arbitrarily outputs a voltage in response to a setting signal from a microcomputer 103*a*. An A/D converter 103*b* digitalizes an input voltage. A comparator 103*d* detects whether or not a current at a primary winding of a transformer 104 (described later) has reached a setting current based on the voltage generated at a resistor 123. A resistor 103*e* pulls up the output of the comparator 103*d*. A secondary current discharge time measuring block 103*f* measures the discharge time of a secondary current.

By applying a current to a loop formed by the positive pole of the battery 101, the primary winding of the transformer 104, and the negative pole of the battery 101, energy is accumulated in the core of the transformer 104 so that a back electromotive force is generated due to the energy. A field-effect transistor (hereinafter referred to as a FET) 105 drives the current of the primary winding of the transformer 104. A main capacitor 107 accumulates electrical charge. The anode of a high-voltage rectifier diode 106 is connected to the end of the secondary winding of the transformer 104 and the cathode thereof is connected to the anode of the main capacitor 107. A resistor 119 is connected between the base and emitter of a transistor 120, which will be described later. The base of the transistor 120 is connected to the cathode of the main capacitor 107, and the emitter thereof is connected to the start of the secondary winding of the transformer 104. Accordingly, a current loop for accumulating the back electromotive force generated at the secondary winding of the transformer 104 in the main capacitor 107 includes the high-voltage rectifier diode 106.

One end of a resistor 121 is connected to the collector of the transistor 120 and the other end thereof is connected to the control circuit 103. The resistor 123 pulls up the input of the control circuit 103, to which the resistor 121 is connected, to a power supply Vcc. A trigger circuit 108 is also provided. A discharge tube 109 receives a trigger voltage from the trigger circuit 108 and emits light by using the charge accumulated in the main capacitor 107. A charging voltage dividing circuit 110 divides the voltage accumulated in the main capacitor 107 and detects a charging voltage by using the A/D converter 103*b* in the control circuit 103.

A light-measuring device 111 detects subject brightness. A distance-measuring device 112 detects the distance to a subject. A lens drive 113 drives a taking lens based on a measurement result generated by the distance-measuring device 112 so as to focus on the subject. A shutter drive 114 controls exposure based on a measurement result generated by the light-measuring device 111. A film drive 115 performs auto-loading, advancing, and rewinding of a film. A main switch (MAINSW) 116 is used to switch the camera to a standby mode. A switch (SW1) 117 is turned on by a first stroke of a shutter button so that the electrical circuit in the camera is activated and light-measurement and distance-measurement are performed. A switch (SW2) 118 is turned on by a second stroke of the shutter button so that an activation signal for a photographic sequence performed after the switch SW1 is turned on is generated.

Also, in FIG. 1, reference letter a denotes a gate input signal (FETGATE) of the FET 105, reference letter b denotes a primary current flowing through the primary winding of the transformer 104, reference letter c denotes a secondary current flowing through the secondary winding of the transformer 104, and reference letter d denotes a secondary current detection signal flowing through the line connected to the resistors 121 and 122 and the control circuit 103.

Figure 2A:
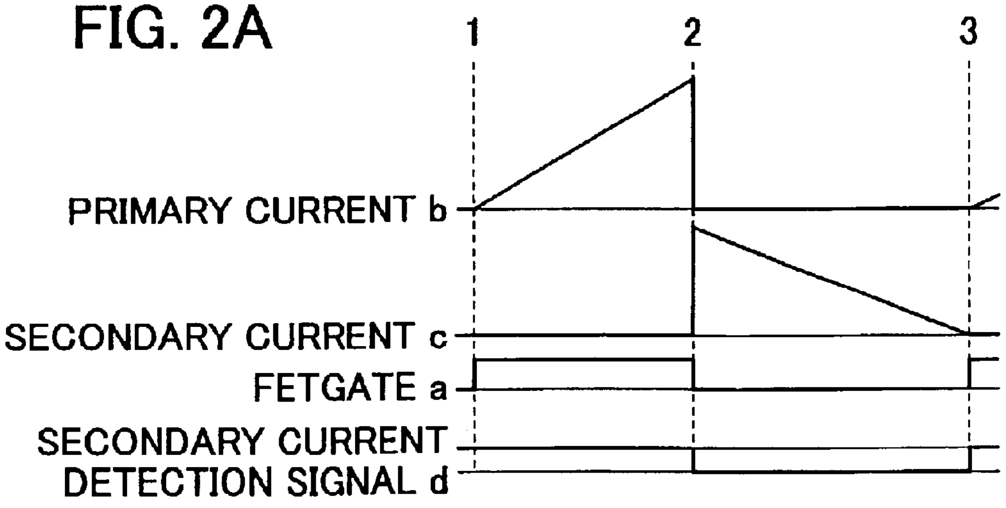
FIGS. 2A to 2C are time charts when the circuit operates normally in a first embodiment.
Figure 2B:
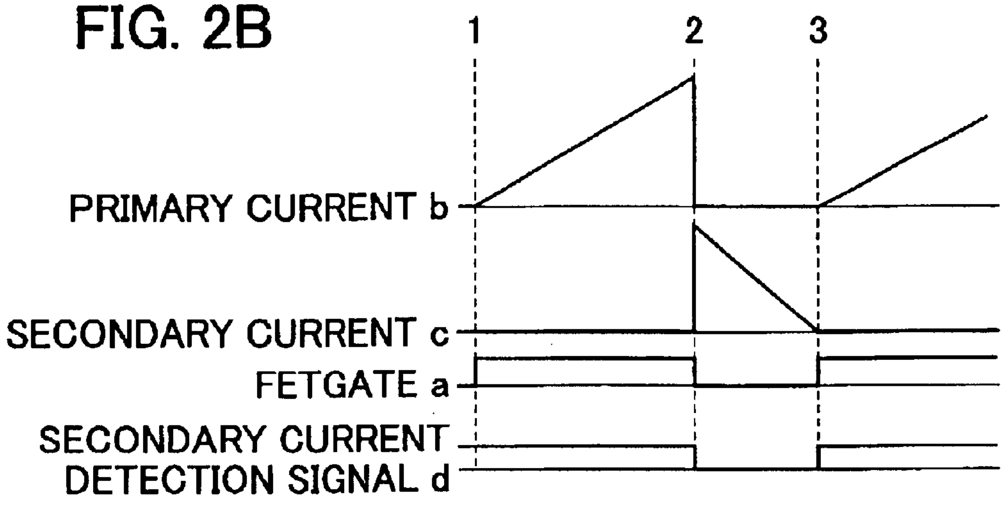
Figure 2C:
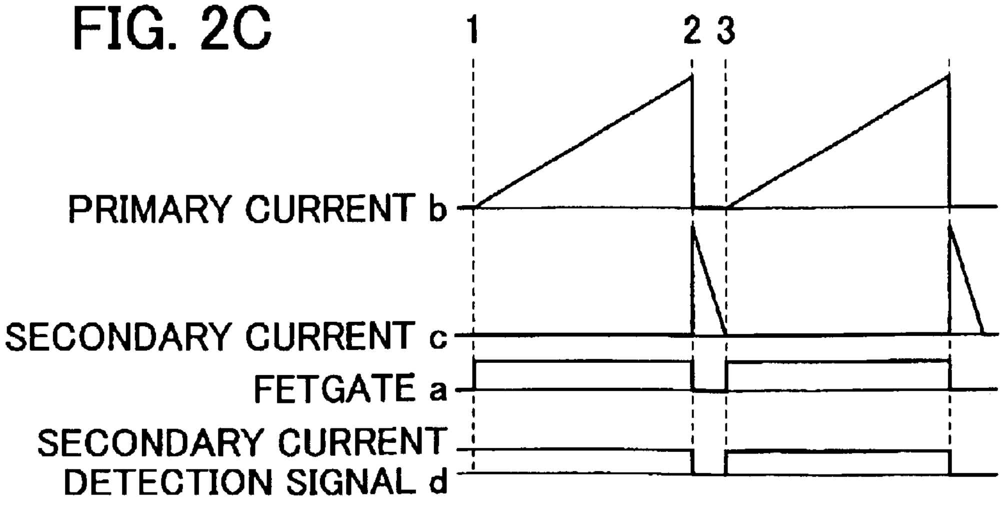

FIGS. 2A to 2C are time charts of a step-up operation. Specifically, FIG. 2A shows the currents and signals a to d when the charging voltage of the main capacitor 107 is about 50 V, FIG. 2B shows the currents and signals a to d when the charging voltage of the main capacitor 107 is about 150 V, and FIG. 2C shows the currents and signals a to d when the charging voltage of the main capacitor 107 is about 300 V.

Next, a step-up operation will be described with reference to FIG. 2A, in which the charging voltage of the main capacitor 107 is about 50 V.

A predetermined oscillation signal is applied from the control circuit 103 to the gate of the FET 105 through a connection terminal (a: at time 1). At this time, a high-level signal is applied to the control electrode of the FET 105, and thus a current flows through the loop including the drain and source of the FET 105, the primary winding of the transformer 104, and the negative pole of the battery. Accordingly, an induced electromotive force is generated at the secondary winding of the transformer 104. However, the polarity of this current is changed so that the current is blocked by the high-voltage rectifier diode 106. Thus, an excitation current does not flow from the transformer 104 and energy is accumulated in the core of the transformer 104. The accumulation of energy (current drive) continues until the current of the primary winding reaches a predetermined level (b: at time 2).

When the current of the primary winding reaches the predetermined level, the gate of the FET 105 is switched to a low-level and the FET 105 is turned off (a: at time 2) so that the current is blocked and the FET 105 is brought into a non-conducting state. Accordingly, a back electromotive force is generated at the secondary winding of the transformer 104. The back electromotive force flows as the secondary current through the loop of the rectifier diode 106, the main capacitor 107, the resistor 119, and the transistor 120 (c: from time 2 to 3), and electrical charge is accumulated in the main capacitor 107. Then, the energy in the transformer 104 is emitted, and the secondary current detection signal d, which has been at low-level because of the divided secondary current, is inverted from a low-level to a high-level when the secondary current c stops (d: at time 3). When the secondary current detection signal d is inverted from a low-level to a high-level, the control circuit 103 allows a high-level signal to be generated at the gate of the FET 105 again. Also, the FET 105 conducts (a: at time 3) so as to accumulate energy in the transformer 104. Then, the FET 105 is brought into a non-conducting state due to a low-level signal, the energy accumulated in the transformer 104 is emitted, and the main capacitor 107 is charged.

These operations are repeatedly performed. As shown in FIGS. 2A, 2B, and 2C, the discharge time of the secondary current c (time 2 to 3) is shortened while the voltage at the main capacitor 107 is increased. This charging circuit is generally called a flyback charging circuit.

Hereinafter, the operation of the circuit shown in FIG. 1 will be described with reference to FIGS. 3 to 6.

First, a sequence performed when the main switch 116 is ON is described with reference to the flowchart shown in FIG. 3.

In step #101, it is determined whether or not the main switch 116 is turned ON. If the main switch 116 is ON, the process proceeds to step #102, where the battery is checked so as to determine whether or not there is enough voltage in the battery to operate the camera, and the result is stored in a RAM in the microcomputer 103*a*. In step #103, it is determined whether or not there is enough voltage in the battery to operate the camera. If there is enough voltage in the battery to operate the camera, the process proceeds to step #104. Otherwise, the process returns to step #101.

In step #104, the light-measuring device 111 measures light so as to detect subject brightness and a measurement result is stored in the RAM in the microcomputer 103*a*. Then, in step #105, it is determined whether or not strobing is necessary for photography based on the light measurement result, which was stored in the RAM in the microcomputer 103*a* in step #104. If it is determined that strobing is not necessary and that strobe precharge is not necessary, the sequence is completed. On the other hand, if it is determined that strobing is necessary and that precharge of the strobe is necessary in step #105, the process proceeds to step #106, where the strobe device is charged in a flash mode (details of strobe charging will be described later with reference to FIG. 4). Then, the sequence is completed.

Next, the operation in the flash mode in step #106 of FIG. 3 will be described with reference to the flowchart shown in FIG. 4.

First, a charge timer is started in step #301. Then, in step #302, a drive signal is output from the control circuit 103 to the gate of the FET 105 by the circuit operation described above so that charging is started. In step #303, the discharge time of the secondary current is detected. The discharge time of the secondary current corresponds to time 2 to 3 in FIGS. 2A to 2C. The discharge time is measured by the secondary current discharge time measuring block 103*f*. That is, the measurement is started by using a counter when the drive signal of the FET 105 (FETGATE a) is switched off (at the falling edge), and is stopped when the secondary current c has been completely discharged (when the secondary current detection signal d is switched to a high-level). The discharge time of the secondary current is measured in order to detect a circuit malfunction.

Now, a circuit operation performed when a discharge loop, which is formed by the secondary winding of the transformer 104, the rectifier diode 106, the main capacitor 107, and the transistor 120, is in an open state will be described with reference to the time chart shown in FIG. 5.

Figure 5:
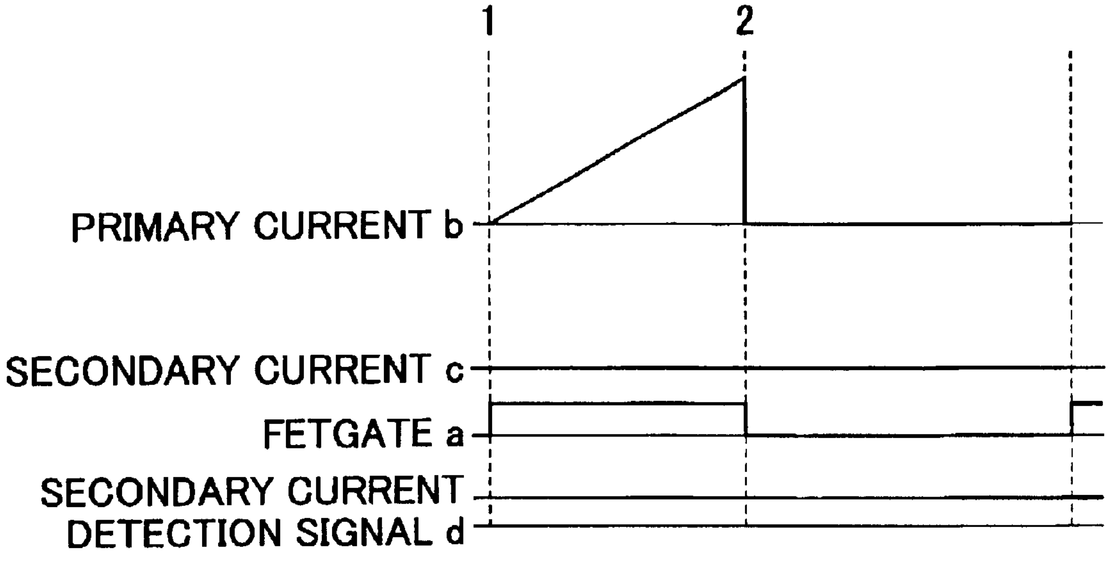
FIG. 5 is a time chart when a circuit malfunction is caused in the first embodiment.

A predetermined oscillation signal is applied from the control circuit 103 to the gate of the FET 105 through a connection terminal (a: at time 1 in FIG. 5). At this time, a high-level signal is applied to the control electrode of the FET 105, and thus a current flows through the loop including the drain and source of the FET 105, the primary winding of the transformer 104, and the negative pole of the battery. Accordingly, an induced electromotive force is generated at the secondary winding of the transformer 104. However, since the discharge loop is open, an excitation current does not flow from the transformer 104 and energy is accumulated in the core of the transformer 104. The accumulation of energy (current drive) continues until the current of the primary winding reaches a predetermined level (b: at time 2).

When the current of the primary winding reaches the predetermined level, the gate of the FET 105 is switched to a low-level and the FET 105 is turned off (a: at time 2) so that the current is blocked and the FET 105 is brought into a non-conducting state. At the same time, measurement of the secondary current discharge time is started by the counter of the secondary current discharge time measuring block 103*f*. Accordingly, a back electromotive force is generated at the secondary winding of the transformer 104. If the circuit operates normally, the back electromotive force flows as the secondary current through the loop of the rectifier diode 106, the main capacitor 107, and the transistor 120 (from time 2 to 3 in FIGS. 2A to 2C), and electrical charge is accumulated in the main capacitor 107.

However, when the discharge loop in the secondary side is open, the secondary current c is not generated (c: at time 2 in FIG. 5). Therefore, even if the gate of the FET 105 is switched to a low-level and the FET 105 is turned off (a: at time 2 in FIG. 5) so as to block the current so that the FET 105 is brought into a non-conducting state, the secondary current detection signal d does not change to a low-level and is kept at a high-level (d: at time 2 in FIG. 5). Accordingly, the secondary current discharge time is not detected by the secondary current discharge time measuring block 103*f*, and thus a trouble in the circuit can be detected.

Next, another example of a trouble in the circuit, that is, a circuit operation performed when the primary or secondary winding of the transformer 104 is shorted, will be described with reference to the time chart shown in FIG. 6.

Figure 6:
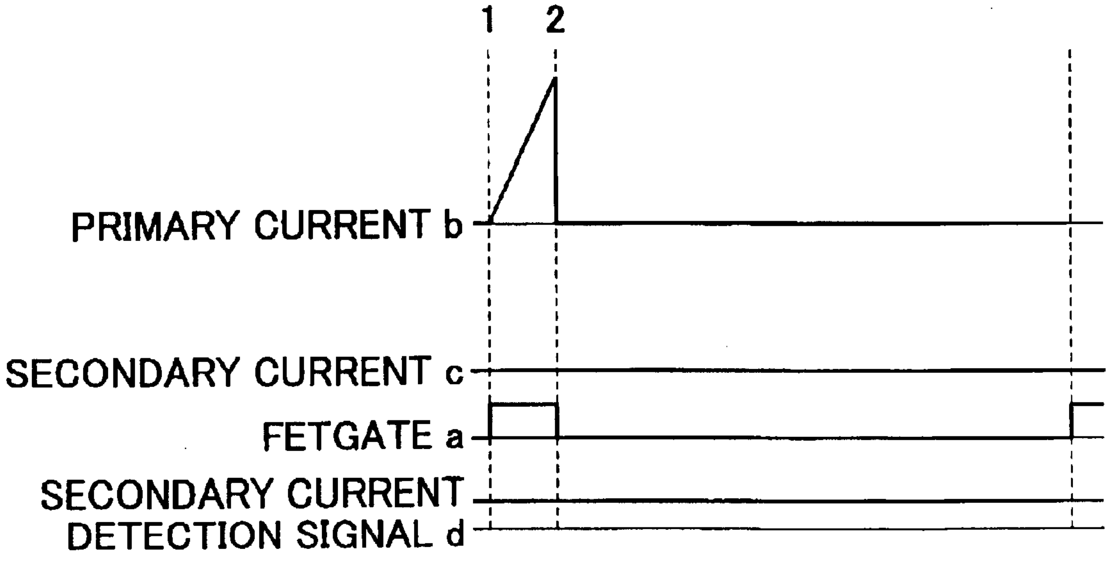
FIG. 6 is another time chart when a circuit malfunction is caused in the first embodiment.

A predetermined oscillation signal is applied from the control circuit 103 to the gate of the FET 105 through a connection terminal (a: at time 1 in FIG. 6). At this time, a high-level signal is applied to the control electrode of the FET 105, and thus a current flows through the loop including the drain and source of the FET 105, the shorted primary winding of the transformer 104, and the negative pole of the battery. The primary current is driven until it reaches a predetermined level (b: at time 2 in FIG. 6). At this time, the current of the shorted primary winding rapidly increases to reach the predetermined level. When the primary current reaches the predetermined level, the gate of the FET 105 is switched to a low-level and the FET 105 is turned off (a: at time 2 in FIG. 6) so that the current is blocked and the FET 105 is brought into a non-conducting state. At this time, a back electromotive force is generated in the secondary winding of the transformer 104 if the circuit operates normally.

However, energy is not accumulated in the transformer 104 if the primary winding is shorted. Therefore, as in the previous example in which the secondary discharge loop is open, the secondary current detection signal d does not change to a low-level and is kept at a high-level (d: at time 2 in FIG. 6) even if the gate of the FET 105 is switched to a low-level and the FET 105 is turned off (a: at time 2 in FIG. 6) so that the current is blocked and the FET 105 is brought into a non-conducting state. Accordingly, the secondary current discharge time measuring block 103*f* does not measure the discharge time, and thus a trouble in the circuit can be detected.

Also, when the secondary winding is shorted, the time chart is the same as when the primary winding is shorted, and a trouble in the circuit can be detected.

As described above, the discharge time of the secondary current c is detected when the circuit operates normally. On the other hand, the secondary current discharge time is not detected when circuit problems occur, that is, when the discharge loop, which is formed by the secondary winding of the transformer 104, the rectifier diode 106, the main capacitor 107, and the transistor 120, is in an open state, or when the primary or secondary winding of the transformer 104 is shorted. The measurement result of the discharge time is stored in the RAM in the microcomputer 103*a*. The result can be detected when a first drive of the primary current is performed. Thus, a circuit malfunction can be detected early after charging is started, without waiting for a predetermined time as in the known art.

Referring back to FIG. 4, in step #304, it is determined whether or not the circuit is in an abnormal state based on the detection result of the secondary current discharge time detected in step #303. As described above, the circuit is in a normal state if the secondary current discharge time can be detected. Thus, in this case, the process proceeds from step #304 to step #307. However, the circuit has a trouble if the secondary current discharge time cannot be detected. In that case, the process proceeds from step #304 to step #305, where charging is stopped, and in step #306, a circuit malfunction flag is indicated so as to complete the charging sequence.

On the other hand, if it is determined that the circuit is in a normal state in step #304, the process proceeds to #307, where the charging voltage dividing circuit 110 detects the charging voltage by the A/D converter 103*b* in the control circuit 103, and the detection result is stored in the RAM in the microcomputer 103*a*. Then, in step #308, it is determined whether or not the charging voltage detected in step #307 is a charge completion voltage. If the charge completion is not detected, the process proceeds to step #311, where it is determined whether or not the charge timer, which was started in step #301, has counted up a predetermined time. If the predetermined time has elapsed, the process proceeds to step #312, where the charge which started in step #302 is stopped. Then, in step #313, a charge error flag is indicated so as to complete the charging sequence.

On the other hand, if the predetermined time has not elapsed in step #311, the process returns to step #302 so that charge is continued. Then, the operations of steps #303, #304, #307, #308, and #311 are performed again. If a charge completion can be detected in step #308, the process proceeds to step #309, where the charge which started in step #302 is stopped. Then, in step #310, a charge OK flag is indicated so as to complete the charging sequence and also the sequence performed when the main switch is ON, as shown in FIG. 3, is completed.

Next, a release sequence of the camera will be described with reference to the flowchart in FIG. 7.

First, in step #201, the state of the switch (SW1) 107, which is switched ON by the first stroke of the release button, is checked. If the switch (SW1) 107 is not ON, the process does not proceed until the switch 107 is switched ON. When the switch SW1 is switched ON, the process proceeds to step #202, where the battery is checked so as to detect whether or not there is enough voltage in the battery to operate the camera, as in the above-described step #102 in FIG. 3. The detection result is stored in the RAM in the microcomputer 103*a*. Then, in step #203, it is determined whether or not there is enough voltage in the battery to operate the camera based on the result of battery check performed in step #202. If there is enough voltage in the battery to operate the camera, the process proceeds to step #204. Otherwise, the process returns to step #201.

In step #204, the distance-measuring device 112 measures the distance to the subject, and the measurement result is stored in the RAM in the microcomputer 103*a*. Then, in step #205, the light-measuring device 111 detects the subject brightness, and the result is stored in the RAM in the microcomputer 103*a*.

After that, the process proceeds to step #206, where it is determined whether or not strobing is necessary based on the result of light measurement generated in step #205. The strobe should be used if the photographic environment is dark or is in a backlight condition. The process proceeds to step #207 if the strobe should be used. Otherwise, the process proceeds to step #209 so as to wait for the switch (SW2) 118 to be turned on.

Figure 4:
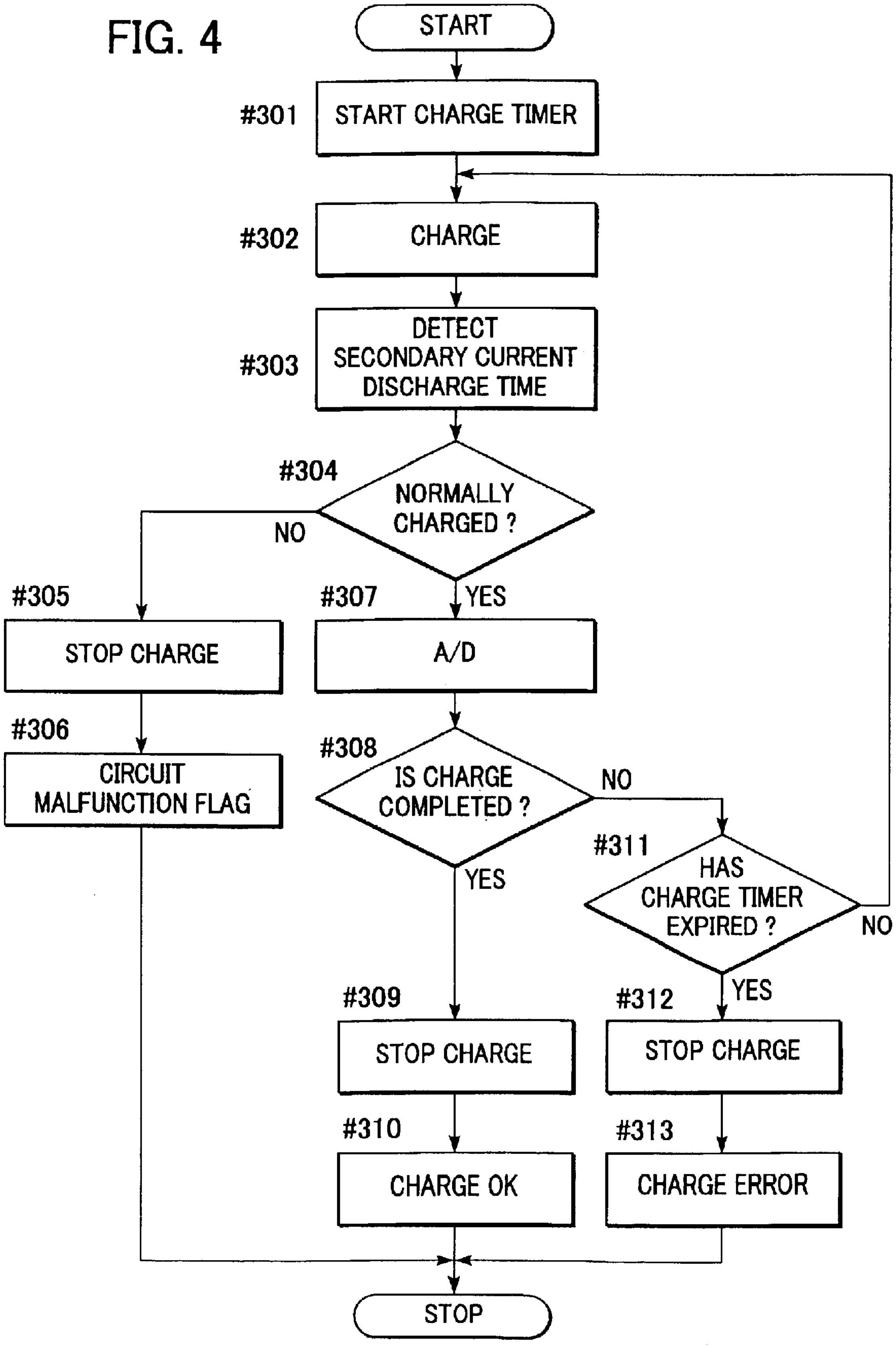
FIG. 4 is a flowchart illustrating a charging operation according to the first embodiment.

If it is determined that strobing is necessary in step #206 so that the process proceeds to step #207, the charging sequence illustrated by the flowchart shown in FIG. 4 is performed. Description of the charging sequence is omitted. After that, the process proceeds to step #208, where it is determined whether or not charging is completed. The determination is performed based on the flag indicating that the charge is completed or not completed in the charging sequence of step #207. If the charging is completed, the process proceeds to step #209 so as to wait for the switch (SW2) 118 to be turned on. On the other hand, the process returns to step #201 if the charging is not completed.

In step #209, when the switch (SW2) 118 is turned ON, the process proceeds to step #210, where the driving of the taking lens is controlled by the lens drive 113 in accordance with the distance measurement result obtained in step #204. Then, in step #211, the trigger circuit 108 outputs a flash signal in response to a trigger signal from the control circuit 103 so that the strobe flashes, if it is determined that strobing is necessary based on the light-measurement result obtained in step #205. At the same time, the shutter drive 114 controls the driving of the shutter. Then, in step #212, the lens is reset so that the lens in a focus position is set to the initial position.

Then, in step #213, the film drive 115 advances a film frame. In step #214, it is determined whether or not the strobe should be precharged. Herein, the case where the strobe is not precharged is the case where the result of determination performed in step #206 based on the light measurement result of step #205 is not the flash mode. In this case, the process returns to step #201.

If the strobe is to be precharged, the process proceeds from step #214 to step #215, where the charging sequence illustrated in the flowchart shown in FIG. 4 is performed. Then, the process returns to step #201.

According to the first embodiment, the flyback DC/DC converter charges the main capacitor 107, the FET 105 drives the current for the primary winding of the transformer 104 in the DC/DC converter, the microcomputer 103*a* detects the secondary current flowing through the secondary winding, the secondary current being generated when the FET 105 stops driving the primary current, and the secondary current discharge time measuring block 103*f* measures the time from when the FET 105 stops driving the current for the primary winding until the secondary current is decreased to a predetermined level. A circuit malfunction can be detected based on the measurement result generated by the secondary current discharge time measuring block 103*f*.

When problems occur in the circuit, for example, when the discharge loop formed by the secondary winding of the transformer 104, the rectifier diode 106, the main capacitor 107, and the transistor 120 is in an open state, or when the primary or secondary winding of the transformer 104 is shorted, the secondary current discharge time cannot be detected. In these cases, the circuit is determined to be malfunctioning.

Further, the secondary current discharge time can be detected at the first driving of the current for the primary winding. Therefore, a circuit malfunction can be detected early after charging is started, without waiting for a predetermined time as in the known art.

Second Embodiment

Hereinafter, a second embodiment of the present invention will be described.

Figure 3:
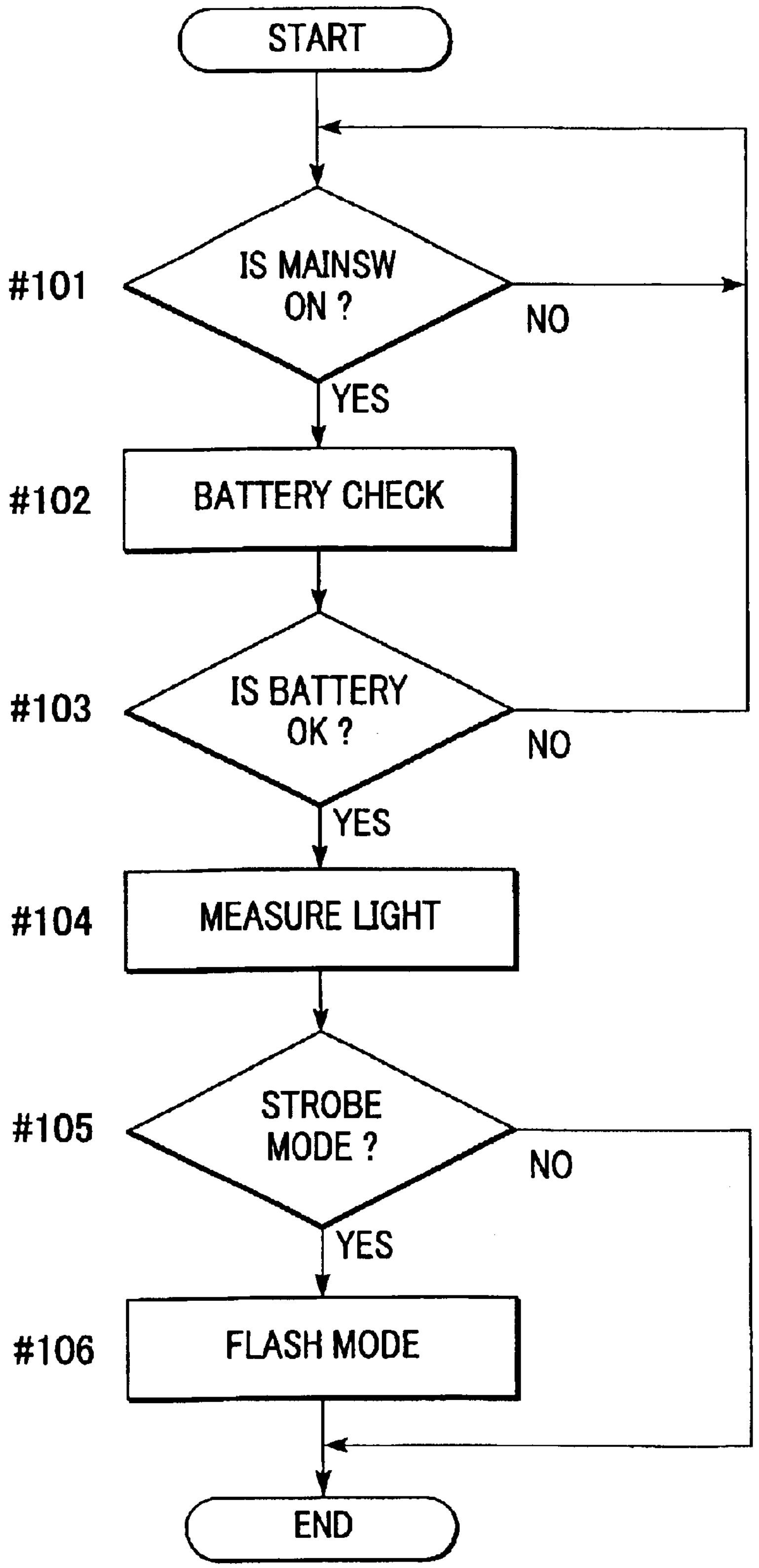
FIG. 3 is a flowchart illustrating part of the operation of the camera according to the first embodiment.
Figure 7:
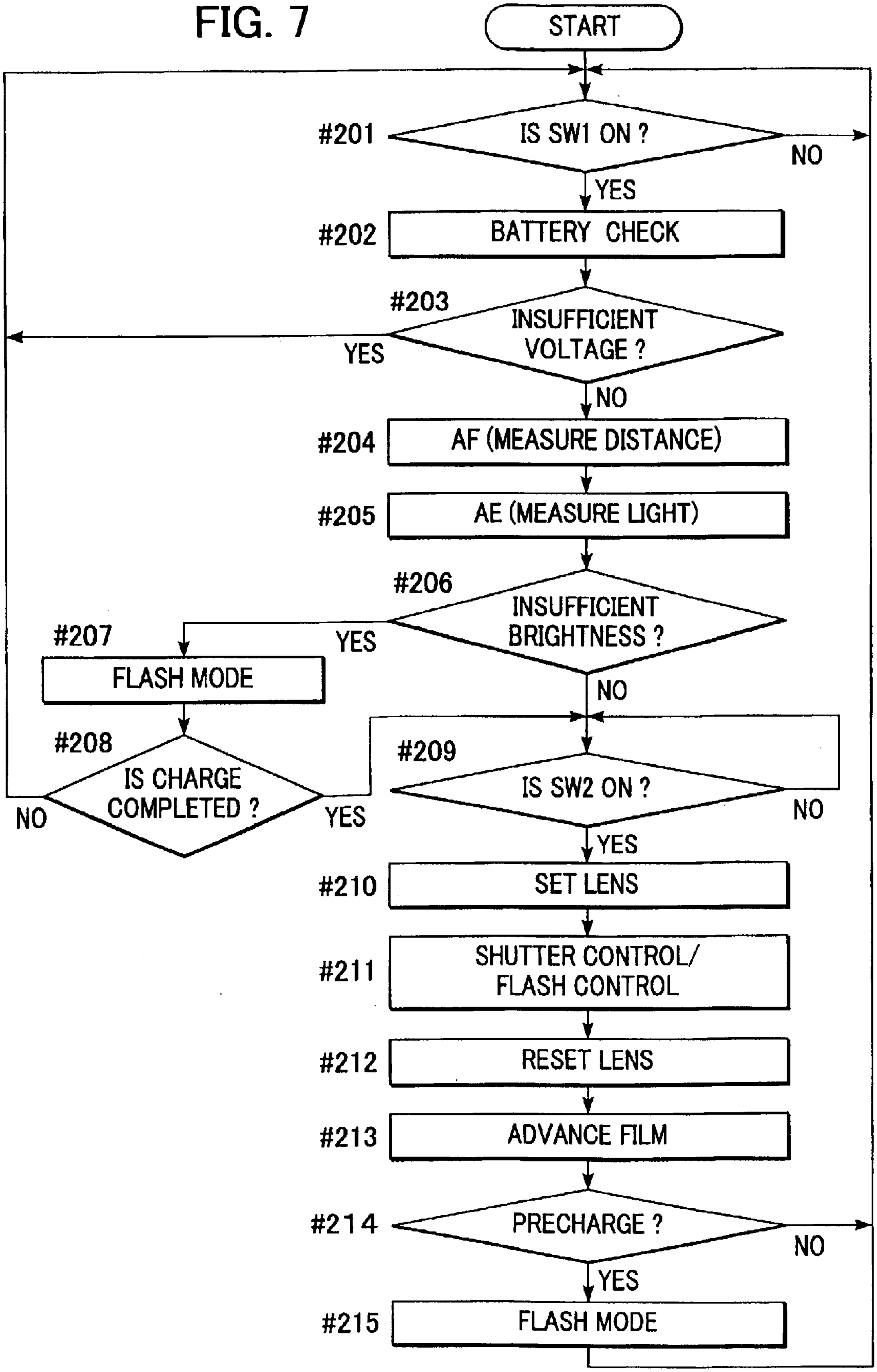
FIG. 7 is a flowchart illustrating a series of operations of the camera according to the first embodiment.
Figure 8:
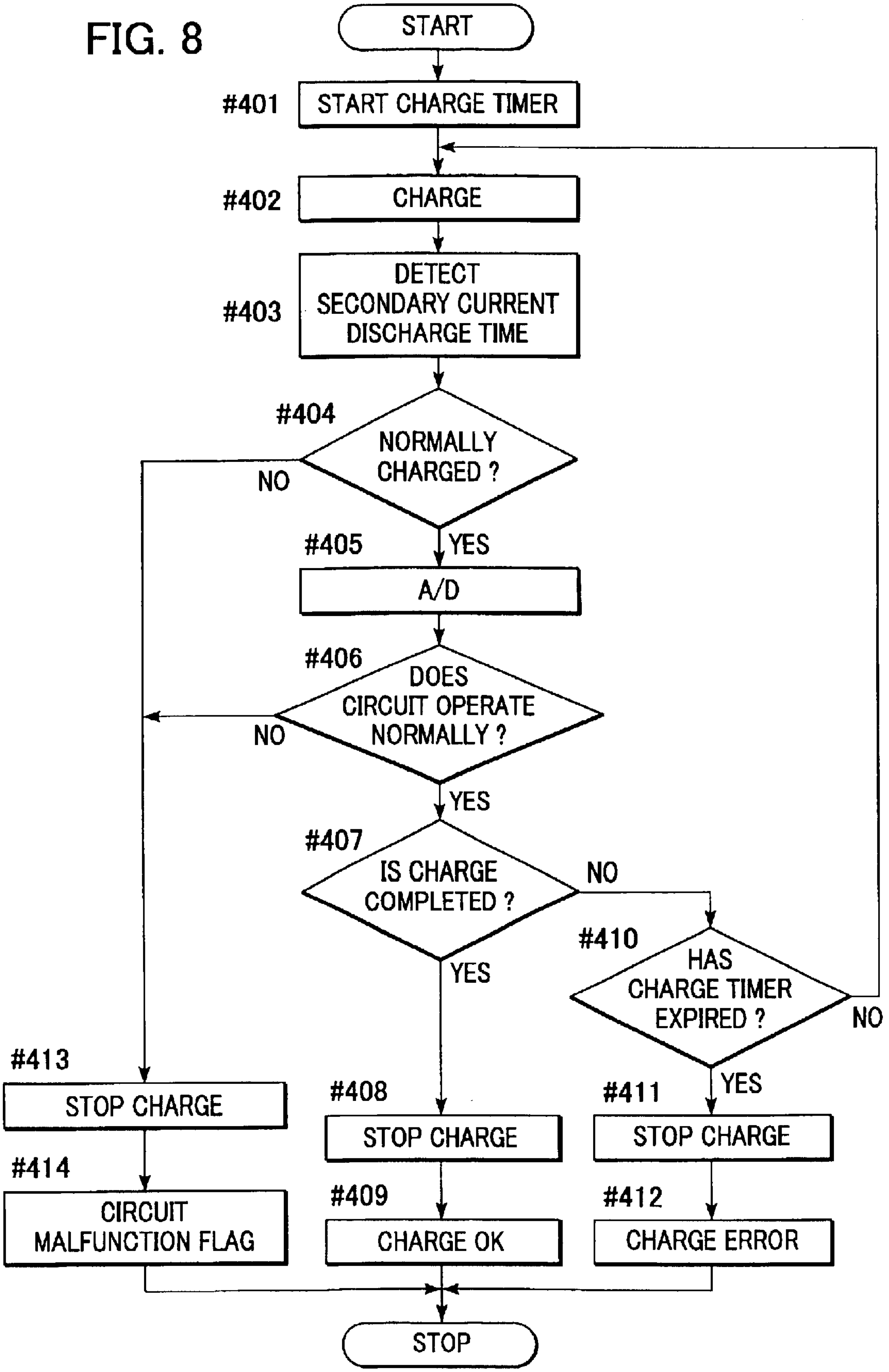
FIG. 8 is a flowchart illustrating a charging operation according to a second embodiment.

The second embodiment is different from the first embodiment only in the flash mode sequence for charging, that is, step #106 of FIG. 3 during the main switch 116 is ON and steps #207 and #215 of FIG. 7 in the release sequence. Thus, the flash mode sequence according to the second embodiment will be described with reference to the flowchart shown in FIG. 8.

In the flash mode, the charge timer is started in step #401. Then, in step #402, a drive signal is output from the control circuit 103 to the gate of the FET 105 by the above-described circuit operation so as to start charge. In step #403, the secondary current discharge time is detected. The secondary current discharge time corresponds to time 2 to 3 of FIGS. 2A to 2C of the above-described circuit operation. The discharge time is measured by the secondary current discharge time measuring block 103*f*. That is, the measurement is started by using a counter when the drive signal of the FET 105 is switched off (at the falling edge), and is stopped when the secondary current has been completely discharged (when the secondary current detection signal d is switched to a high-level). The discharge time of the secondary current is measured in order to detect a circuit malfunction.

Now, a circuit operation performed when a discharge loop, which is formed by the secondary winding of the transformer 104, the rectifier diode 106, the main capacitor 107, and the transistor 120, is in an open state will be described with reference to the time chart shown in FIG. 5.

A predetermined oscillation signal is applied from the control circuit 103 to the gate of the FET 105 through a connection terminal (a: at time 1 in FIG. 5). At this time, a high-level signal is applied to the control electrode of the FET 105, and thus a current flows through the loop including the drain and source of the FET 105, the primary winding of the transformer 104, and the negative pole of the battery. Accordingly, an induced electromotive force is generated at the secondary winding of the transformer 104. However, since the discharge loop is open, an excitation current does not flow from the transformer 104 and energy is accumulated in the core of the transformer 104. The accumulation of energy (current drive) continues until the current of the primary winding reaches a predetermined level (b: at time 2 in FIG. 5).

When the current of the primary winding reaches the predetermined level, the gate of the FET 105 is switched to a low-level and the FET 105 is turned off (a: at time 2 in FIG. 5) so that the current is blocked and the FET 105 is brought into a non-conducting state. At the same time, measurement of the secondary current discharge time is started by the counter of the secondary current discharge time measuring block 103*f*. Accordingly, a back electromotive force is generated at the secondary winding of the transformer 104. If the circuit operates normally, the back electromotive force flows as the secondary current through the loop of the rectifier diode 106, the main capacitor 107, and the transistor 120 (from time 2 to 3 in FIGS. 2A to 2C), and electrical charge is accumulated in the main capacitor 107.

However, when the discharge loop in the secondary side is open, the secondary current c is not generated (c: at time 2 in FIG. 5). Therefore, even if the gate of the FET 105 is switched to a low-level and the FET 105 is turned off (a: at time 2 in FIG. 5) so as to block the current so that the FET 105 is brought into a non-conducting state, the secondary current detection signal d does not change to a low-level and is kept at a high-level (d: at time 2 in FIG. 5). Accordingly, the secondary current discharge time is not detected by the secondary current discharge time measuring block 103*f*, and thus a trouble in the circuit can be detected.

Next, another example of a trouble in the circuit, that is, a circuit operation performed when the primary or secondary winding of the transformer 104 is shorted, will be described with reference to the time chart shown in FIG. 6.

A predetermined oscillation signal is applied from the control circuit 103 to the gate of the FET 105 through a connection terminal (a: at time 1 in FIG. 6). At this time, a high-level signal is applied to the control electrode of the FET 105, and thus a current flows through the loop including the drain and source of the FET 105, the shorted primary winding of the transformer 104, and the negative pole of the battery. The primary current is driven until it reaches a predetermined level (b: at time 2 in FIG. 6). At this time, the current of the shorted primary winding rapidly increases to reach the predetermined level. When the primary current reaches the predetermined level, the gate of the FET 105 is switched to a low-level and the FET 105 is turned off (a: at time 2 in FIG. 6) so that the current is blocked and the FET 105 is brought into a non-conducting state. At this time, a back electromotive force is generated in the secondary winding of the transformer 104 if the circuit operates normally.

However, energy is not accumulated in the transformer 104 if the primary winding is shorted. Therefore, as in the previous example in which the secondary discharge loop is open, the secondary current detection signal d does not change to a low-level and is kept at a high-level (d: at time 2 in FIG. 6) even if the gate of the FET 105 is switched to a low-level and the FET 105 is turned off (a: at time 2 in FIG. 6) so that the current is blocked and the FET 105 is brought into a non-conducting state. Accordingly, the secondary current discharge time measuring block 103*f* does not measure the discharge time, and thus a trouble in the circuit can be detected.

Also, when the secondary winding is shorted, the time chart is the same as when the primary winding is shorted, and a trouble in the circuit can be detected.

As described above, the discharge time of the secondary current c is detected when the circuit operates normally. On the other hand, the secondary current discharge time is not detected when circuit problems occur, that is, when the discharge loop, which is formed by the secondary winding of the transformer 104, the rectifier diode 106, the main capacitor 107, and the transistor 120, is in an open state, or when the primary or secondary winding of the transformer 104 is shorted. The measurement result is stored in the RAM in the microcomputer 103*a*.

Referring back to FIG. 8, in step #404, it is determined whether or not the circuit is in an abnormal state based on the detection result of the secondary current discharge time detected in step #403. As described above, the drive loop circuit of the primary winding formed by the battery 101, the transformer 104, and the FET 105, and the discharge loop circuit formed by the secondary winding of the transformer 104, the rectifier diode 106, the main capacitor 107, and the diode 120, are in a normal state if the secondary current discharge time can be detected. Thus, in this case, the process proceeds from step #404 to step #305. However, the circuit is in an abnormal state if the secondary current discharge time cannot be detected. In that case, the process proceeds to step #413, where charging is stopped, and in step #414, a circuit malfunction flag is indicated so as to complete the charging sequence.

On the other hand, if it is determined that the circuit is in a normal state in step #404, the process proceeds to step #405, where the charging voltage dividing circuit 110 detects the charging voltage by the A/D converter 103*b* in the control circuit 103, and the detection result is stored in the RAM in the microcomputer 103*a*. Then, in step #406, the secondary current discharge time detected in step #403 is compared with the charging voltage (A/D conversion value) detected in step #405. This comparison is performed in the following manner.

First, the relationship between the charging voltage and the secondary current discharge time will be described with reference to FIG. 9.

Figure 9:
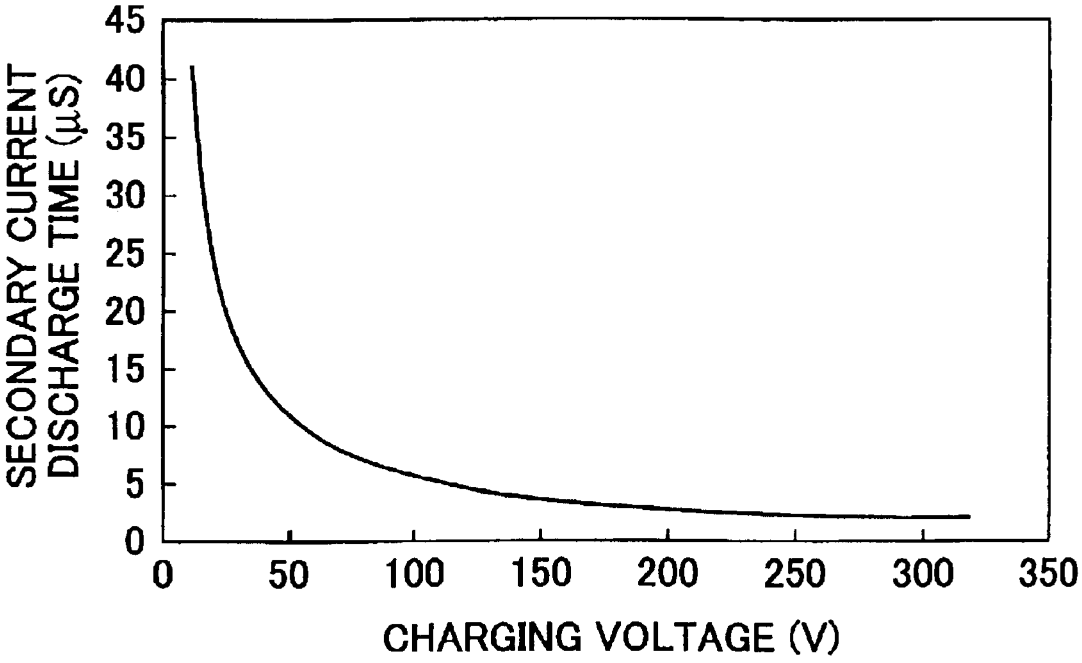
FIG. 9 shows the relationship between a charging voltage and a secondary current discharge time in the second embodiment.

When energy is being accumulated in a transformer with predetermined energy (primary current), the secondary current discharge time changes in accordance with the change in charging voltage as shown in FIG. 9: the secondary current discharge time is about 25 $\mu$s when the charging voltage of the main capacitor is about 20 V, the secondary current discharge time is about 10 μs when the charging voltage is about 50 V, the secondary current discharge time is about 5 μs when the charging voltage is about 100 V, the secondary current discharge time is about 3 μs when the charging voltage is about 200 V, and the secondary current discharge time is about 2 μs when the charging voltage is about 300 V. The relationship between the charging voltage and the secondary current discharge time changes in accordance with the size of the transformer and the number of turns of the winding. The same characteristic is obtained when the size of the transformer and the number of turns of the winding are the same.

That is, in step #406, a rough charging voltage can be determined based on the second current discharge time which has been detected in step #403 and which has been stored in the RAM in the microcomputer 103*a*. Therefore, a circuit malfunction can be detected by comparing the secondary current discharge time with the charging voltage (A/D conversion value) which has been detected in step #405 and which has been stored in the RAM in the microcomputer 103*a*.

Figures 10, 11:
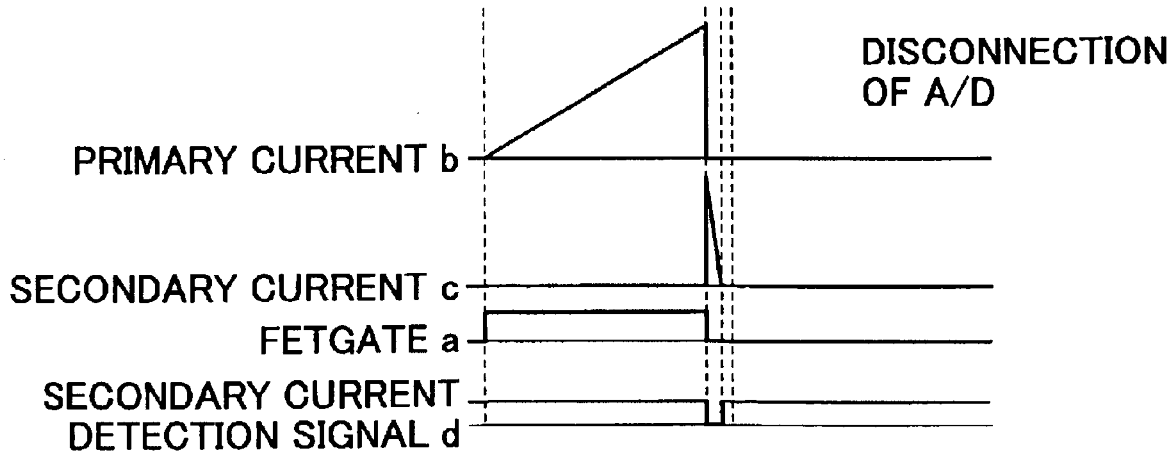
FIG. 10 shows the relationship between a charging voltage and a secondary current discharge time in the second embodiment.
FIG. 11 is a time chart when a circuit malfunction is caused in the second embodiment.

For example, if the charging voltage detected based on the A/D conversion value stored in the RAM in the microcomputer 103*a* is about 50 V and the second current discharge time is 3 μs, it can be determined that a problem is caused in the input of the A/D conversion value for detecting the charging voltage, because the charging voltage should be about 300 V if the circuit operates normally. The problem may include, for example, interference of signals (leakage) and disconnection of the A/D signal line. FIG. 11 is a time chart when disconnection of the A/D converter is caused.

Accordingly, in step #406, where the secondary current discharge time is compared with the charging voltage (A/D conversion value), a circuit malfunction in the system of detecting the charging voltage can be detected, the malfunction cannot be detected only by detecting the secondary current discharge time in step #404.

When the conditions shown in FIG. 10 are fulfilled, it is determined that the circuit operates normally. Otherwise, the circuit is determined to be malfunctioning. The conditions are set with some allowance, in which the secondary current discharge time according to the charging voltage is t. Also, the condition of the secondary current discharge time for operating the circuit normally is set arbitrarily according to the size of the transformer and the number of turns of the winding.

In this way, the secondary current discharge time is compared with the charging voltage (A/D conversion value). If the circuit is determined to be malfunctioning based on the comparison result, the process proceeds to step #413, where charge is stopped. Then, in step #414, a circuit malfunction flag is indicated so as to complete the charge sequence.

On the other hand, when it is determined that the circuit operates normally, the process proceeds to step #407, where it is determined whether or not the charging voltage detected in step #405 is a charge completion voltage. If charge completion is not detected, the process proceeds to step #410, where it is determined whether or not the charge timer which started in step #401 has counted up the predetermined time. If the predetermined time has not elapsed, the process returns to step #402 so as to continue charging. Then, the operations of steps #403, #404, #405, #406, #407, and #410 are performed again. If completion of charge can be detected in step #407, the process proceeds to step #408, where charge which started in step #402 is stopped. Then, in step #409, a charge OK flag is indicated so as to complete the charging sequence.

According to the second embodiment, the flyback DC/DC converter charges the main capacitor 107, the FET 105 drives the current for the primary winding of the transformer 104 in the DC/DC converter, the microcomputer 103*a* detects the secondary current flowing through the secondary winding, the secondary current being generated when the FET 105 stops driving the primary current, and the secondary current discharge time measuring block 103*f* measures the time from when the FET 105 stops driving the current for the primary winding until the secondary current has been discharged. A circuit malfunction can be detected based on the measurement result generated by the secondary current discharge time measuring block 103*f*.

That is, it is determined whether or not the relationship between the secondary current discharge time and the charging voltage (A/D conversion value) detected in step #405 corresponds to the condition shown in FIG. 10. If the relationship does not correspond to the condition, the circuit is determined to be malfunctioning. More specifically, if the charging voltage of the main capacitor 107 in accordance with the detected secondary current discharge time is outside the range of a predetermined voltage, that is, if the condition shown in FIG. 10 is not fulfilled, the circuit is determined to be malfunctioning.

Further, the secondary current discharge time can be detected at the first driving of the current for the primary winding. Therefore, a circuit malfunction can be detected early after charging is started, without waiting for a predetermined time as in the known art.

In the first and second embodiments, a step-up method using separately-excited control of a flyback DC/DC converter by the control circuit 103 is adopted. However, self-excited control may also be used. In this case, by forming the configuration for detecting the secondary current by adopting a step-up method using self-excited control of a flyback DC/DC converter, a circuit malfunction can be detected.

Further, the primary current drive method using separately-excited control is not limited to a current detection type, in which driving of the primary current is stopped when the primary current reaches a predetermined level. Also, a predetermined time drive type, in which the primary current is driven for a predetermined time, can be adopted.

As described above, according to the present invention, a capacitor charging device or a strobe charging device for a camera, in which the number of components does not increase and a circuit malfunction can be detected just after charging is started, can be provided.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A strobe device comprising:

a light-emitting tube;

a main capacitor which accumulates energy and supplies the energy to the light-emitting tube;

a transformer circuit which includes primary and secondary coils in order to accumulate the energy of a power supply in the main capacitor, wherein the primary coil is connected to the power supply and the secondary coil is connected to the main capacitor;

a control circuit which controls a current flowing from the power supply to the primary coil, wherein a current starts to flow through the secondary coil after the control circuit stops a current flowing through the primary coil;

a current detection circuit which detects a current flowing through the secondary coil; and a determination circuit which determines that a malfunction is caused when the current detection circuit detects that a current does not flow through the secondary coil.

2. A strobe device comprising:

a light-emitting tube;

a main capacitor which accumulates energy and supplies the energy to the light-emitting tube;

a transformer circuit which includes primary and secondary coils in order to accumulate the energy of a power supply in the main capacitor, wherein the primary coil is connected to the power supply and the secondary coil is connected to the main capacitor;

a control circuit which controls a current flowing from the power supply to the primary coil, wherein a current starts to flow through the secondary coil after the control circuit stops a current flowing through the primary coil;

a current detection circuit which detects a current flowing through the secondary coil;

a time measuring circuit which measures the time from when the control circuit stops a current flowing through the primary coil until the current detection circuit detects that the current flowing through the secondary coil reaches a predetermined level or until the current flowing through the secondary coil stops; and a determination circuit which determines if the device is malfunctioning based on the measurement result generated by the time measuring circuit.

3. The strobe device according to claim 2, wherein the determination circuit determines the device to be malfunctioning when the measured time is the same or shorter than a predetermined time.

4. The strobe device according to claim 3, further comprising:

a voltage detecting circuit for detecting a charging voltage of the main capacitor, wherein the determination circuit determines if the device is malfunctioning based on the measurement result generated by the time measuring circuit and on a voltage detected by the voltage detecting circuit.

5. A strobe device comprising:

a light-emitting tube;

a main capacitor which accumulates energy and supplies the energy to the light-emitting tube;

a transformer circuit which includes primary and secondary coils in order to accumulate the energy of a power supply in the main capacitor, wherein the primary coil is connected to the power supply and the secondary coil is connected to the main capacitor;

a control circuit which controls a current flowing from the power supply to the primary coil, wherein a current starts to flow through the secondary coil after the control circuit stops a current flowing through the primary coil;

a current detection circuit which detects a current flowing through the secondary coil;

a time measuring circuit which measures the time from when the control circuit stops a current flowing through the primary coil until the current detection circuit detects that the current flowing through the secondary coil reaches a predetermined level or until the current flowing through the secondary coil stops;

a voltage detecting circuit which detects the voltage of the main capacitor; and a determination circuit which determines the operation state of the device based on the measurement result generated by the time measuring circuit and on a voltage detected by the voltage detecting circuit.

6. The strobe device according to claim 5, wherein the determination circuit determines the operation state of the device based on a time corresponding to the voltage detected by the voltage detecting circuit and on the time measured by the time measuring circuit.

7. A camera comprising:

a light-emitting tube;

a main capacitor which accumulates energy and supplies the energy to the light-emitting tube;

a transformer circuit which includes primary and secondary coils in order to accumulate the energy of a power supply in the main capacitor, wherein the primary coil is connected to the power supply and the secondary coil is connected to the main capacitor;

a control circuit which controls a current flowing from the power supply to the primary coil, wherein a current starts to flow through the secondary coil after the control circuit stops a current flowing through the primary coil;

a current detection circuit which detects a current flowing through the secondary coil; and a determination circuit which determines that a malfunction is caused when the current detection circuit detects that a current does not flow through the secondary coil.

8. A camera comprising:

a light-emitting tube;

a main capacitor which accumulates energy and supplies the energy to the light-emitting tube;

a transformer circuit which includes primary and secondary coils in order to accumulate the energy of a power supply in the main capacitor, wherein the primary coil is connected to the power supply and the secondary coil is connected to the main capacitor;

a control circuit which controls a current flowing from the power supply to the primary coil, wherein a current starts to flow through the secondary coil after the control circuit stops a current flowing through the primary coil;

a current detection circuit which detects a current flowing through the secondary coil;

a time measuring circuit which measures the time from when the control circuit stops a current flowing through the primary coil until the current detection circuit detects that the current flowing through the secondary coil reaches a predetermined level or until the current flowing through the secondary coil stops; and a determination circuit which determines if the device is malfunctioning based on the measurement result generated by the time measuring circuit.

9. A camera comprising:

a light-emitting tube;

a main capacitor which accumulates energy and supplies the energy to the light-emitting tube;

a transformer circuit which includes primary and secondary coils in order to accumulate the energy of a power supply in the main capacitor, wherein the primary coil is connected to the power supply and the secondary coil is connected to the main capacitor;

a control circuit which controls a current flowing from the power supply to the primary coil, wherein a current starts to flow through the secondary coil after the control circuit stops a current flowing through the primary coil;

a current detection circuit which detects a current flowing through the secondary coil;

a time measuring circuit which detects the time from when the control circuit stops a current flowing through the primary coil until the current detection circuit detects that the current flowing through the secondary coil reaches a predetermined level or until the current flowing through the secondary coil stops;

a voltage detecting circuit which detects the voltage of the main capacitor; and a determination circuit which detects the operation state of the device based on the measurement result generated by the time measuring circuit and on a voltage detected by the voltage detecting circuit.

10. A capacitor charging device comprising:

a main capacitor which accumulates energy;

a transformer circuit which includes primary and secondary coils in order to accumulate the energy of a power supply in the main capacitor, wherein the primary coil is connected to the power supply and the secondary coil is connected to the main capacitor;

a control circuit which controls a current flowing from the power supply to the primary coil, wherein a current starts to flow through the secondary coil after the control circuit stops a current flowing through the primary coil;

a current detection circuit which detects a current flowing through the secondary coil; and a determination circuit which determines that a malfunction is caused when the current detection circuit detects that a current does not flow through the secondary coil.

11. A capacitor charging device comprising:

a main capacitor which accumulates energy;

a transformer circuit which includes primary and secondary coils in order to accumulate the energy of a power supply in the main capacitor, wherein the primary coil is connected to the power supply and the secondary coil is connected to the main capacitor;

a control circuit which controls a current flowing from the power supply to the primary coil, wherein a current starts to flow through the secondary coil after the control circuit stops a current flowing through the primary coil;

a current detection circuit which detects a current flowing through the secondary coil;

a time measuring circuit which measures the time from when the control circuit stops a current flowing through the primary coil until the current detection circuit detects that the current flowing through the secondary coil reaches a predetermined level or until the current flowing through the secondary coil stops; and a determination circuit which determines if the device is malfunctioning based on the measurement result generated by the time measuring circuit.

12. A capacitor charging device comprising:

a main capacitor which accumulates energy;

a transformer circuit which includes primary and secondary coils in order to accumulate the energy of a power supply in the main capacitor, wherein the primary coil is connected to the power supply and the secondary coil is connected to the main capacitor;

a control circuit which controls a current flowing from the power supply to the primary coil, wherein a current starts to flow through the secondary coil after the control circuit stops a current flowing through the primary coil;

a current detection circuit which detects a current flowing through the secondary coil;

a time measuring circuit which measures the time from when the control circuit stops a current flowing through the primary coil until the current detection circuit detects that the current flowing through the secondary coil reaches a predetermined level or until the current flowing through the secondary coil stops; and a determination circuit which determines if the device is malfunctioning based on the measurement result generated by the time measuring circuit.

* * * * *